United States Patent Office 3,357,521
Patented Dec. 12, 1967

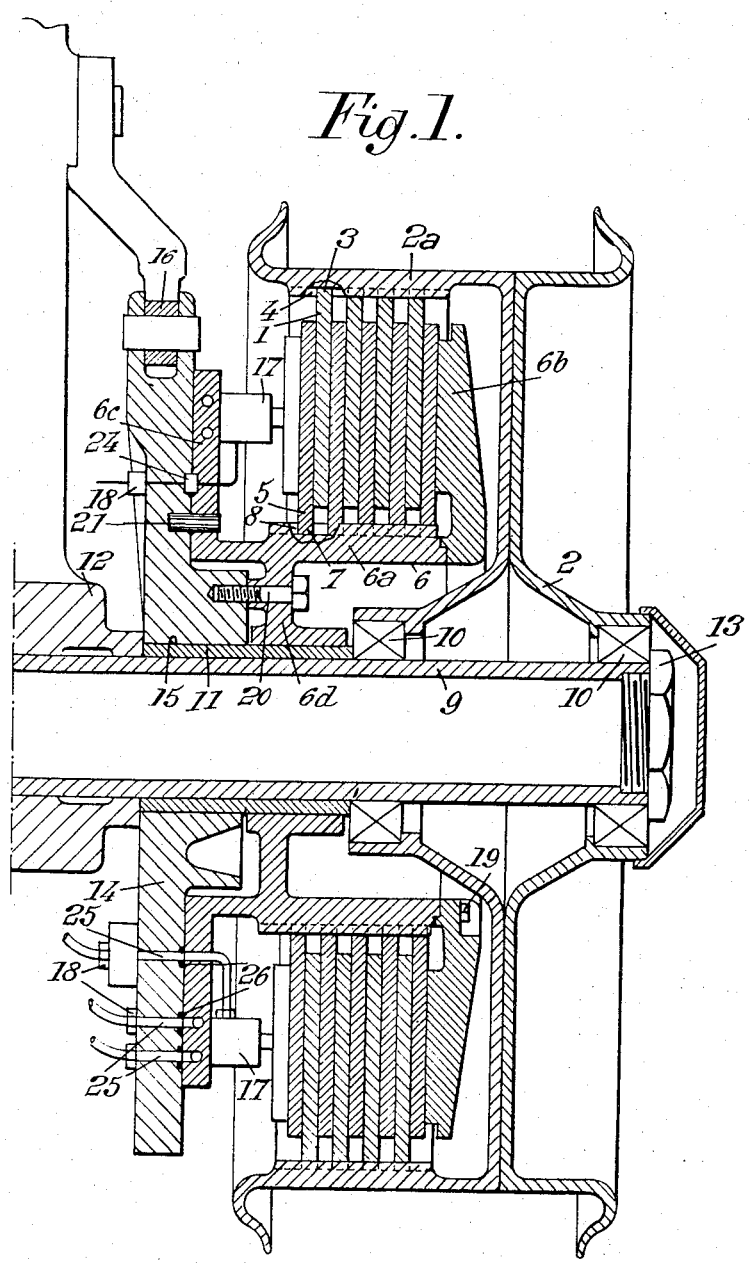

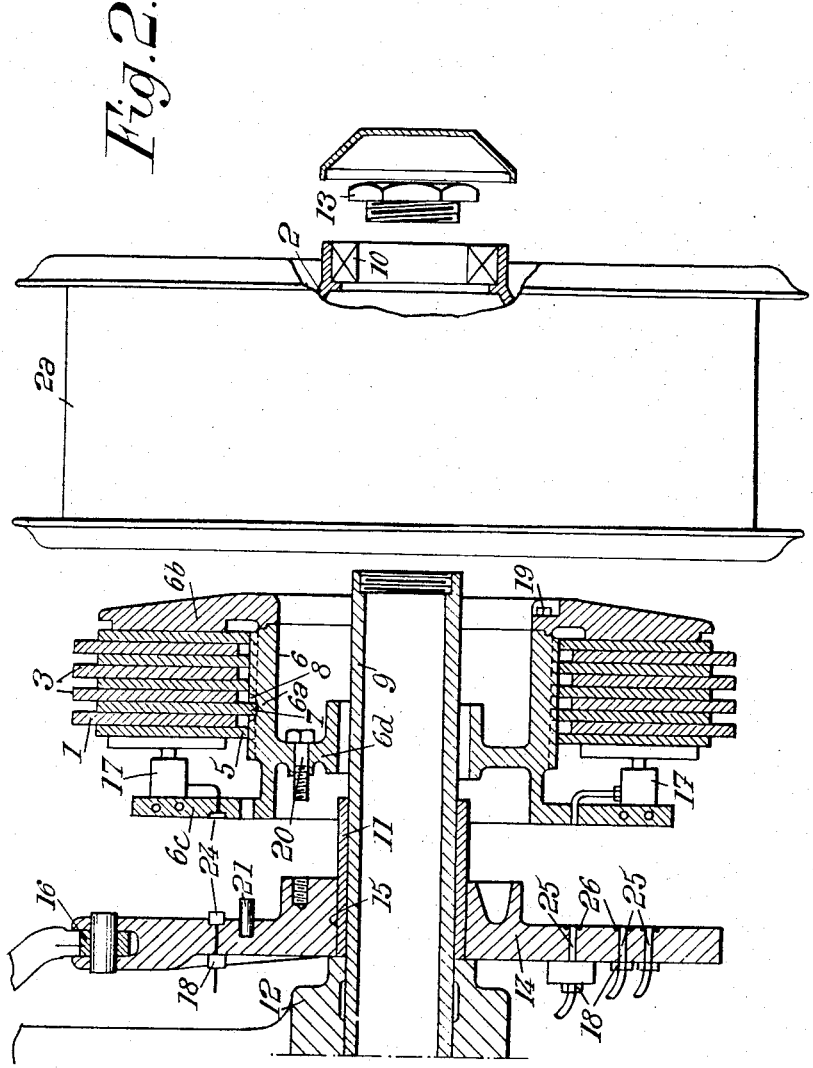

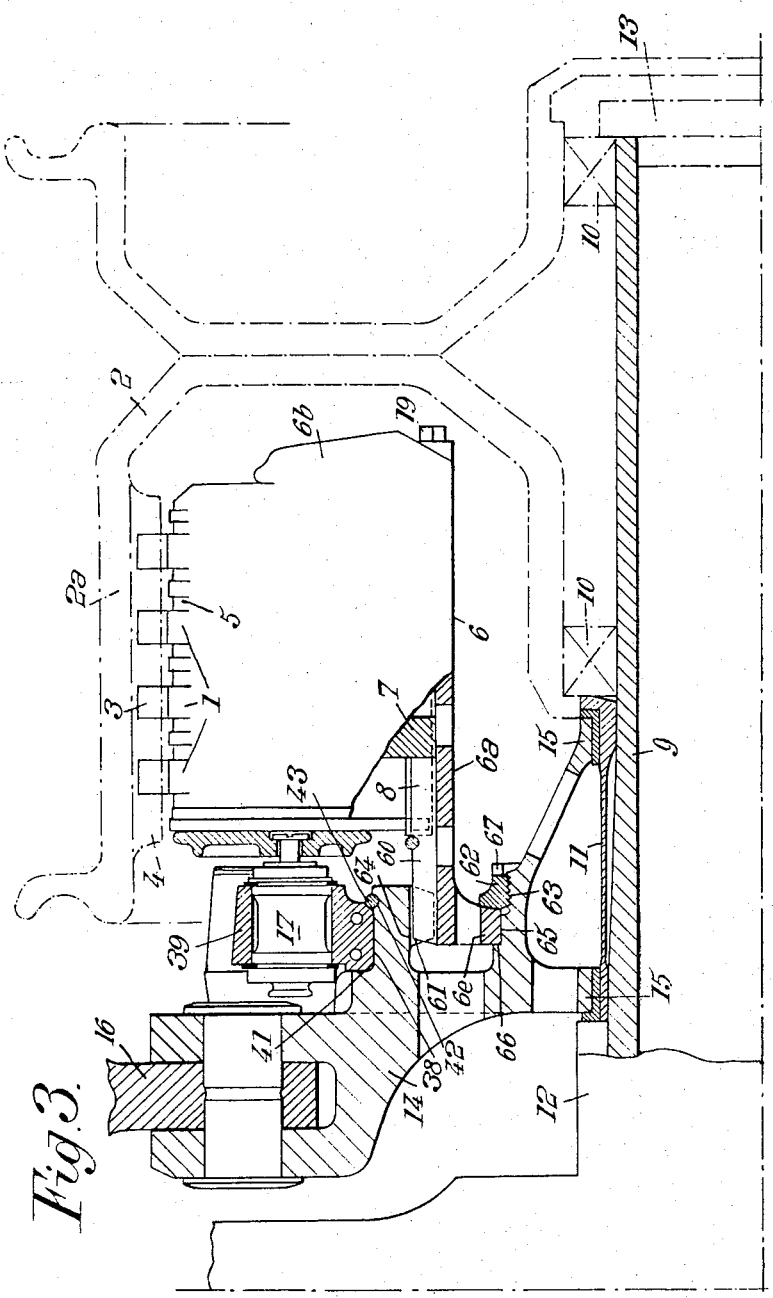

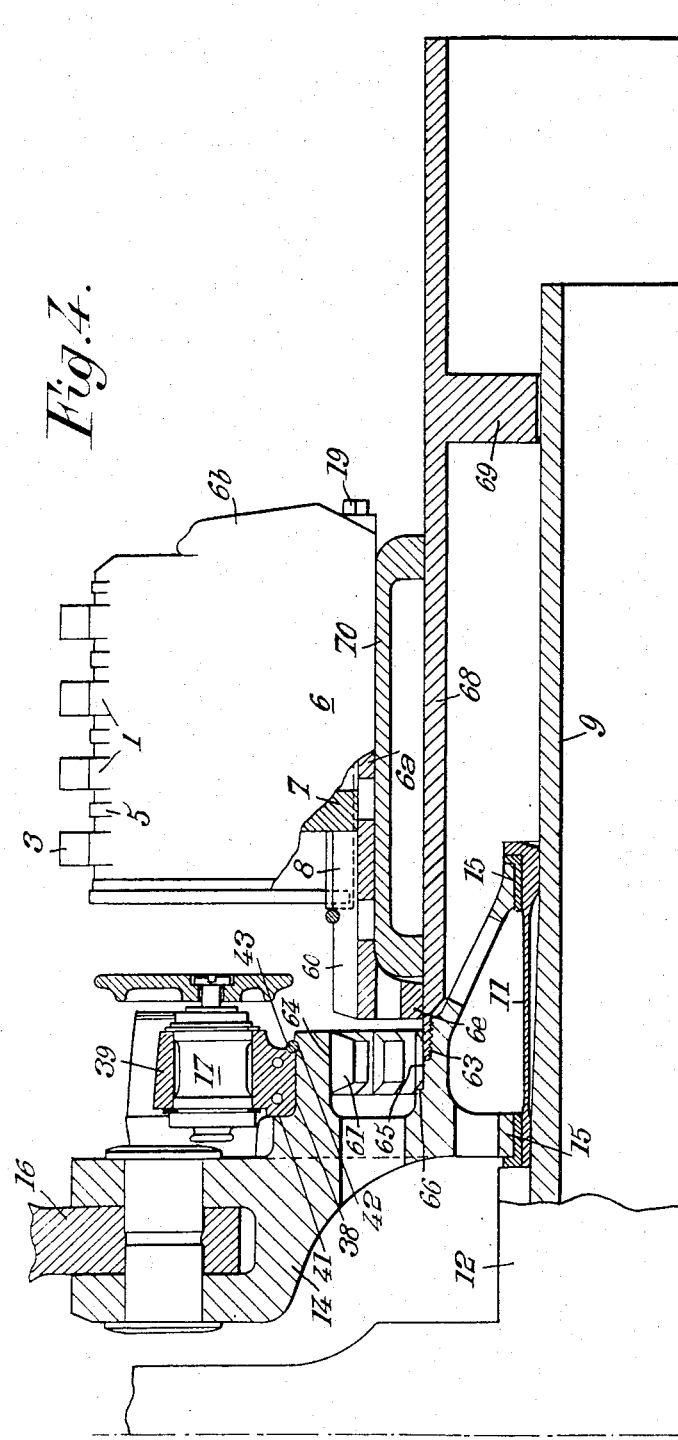

3,357,521
DISC BRAKE ASSEMBLY
Pierre Joseph Martin Lallemant, Port-Marly, France, assignor to Societe Hispano-Suiza-Lallemant, Bois-Colombes, France
Filed Mar. 2, 1966, Ser. No. 531,271
Claims priority, application France, Mar. 11, 1965, 8,895; Apr. 21, 1965, 14,040
3 Claims. (Cl. 188—72)

ABSTRACT OF THE DISCLOSURE

The invention is concerned with a braking device comprising an annular fixed support secured to the stub axle of a vehicle, with an annular holder coaxial to the wheel and secured to said fixed support and containing two pluralities of discs, one angularly fixed to the holder and the other angularly fixed to the vehicle wheel, said discs being juxtaposed, with one disc of a plurality interposed between two discs of the other plurality, the ribs for angularly fixing one of said plurality of discs with said annular holder carrying extensions, of the same cross section, cooperating with longitudinal grooves carried by said annular fixed support.

---

The present invention relates to braking devices, in particular for the wheels of aircraft landing gears, controlled by a fluid, and in particular a hydraulic fluid, the friction elements of which consists of discs.

The chief object of the present invention is to provide a braking device of this kind which is better adapted than those known up to the present time to meet the requirements of practice, in particular concerning the taking to pieces of the device.

Such braking devices comprise, on the one hand, a non rotating tubular element intended to house both the rotating discs and the fixed discs of the brake, and, on the other hand, a fixed support carried by the stub axle of the wheel to be braked and coupled with the framework of the aircraft landing gear through coupling means capable of transmitting the braking torque to said framework, said tubular element and said fixed support being assembled together through first fixation means.

The invention consists in providing a plurality of cylinder-and-piston units, intended longitudinally to actuate the rotating and non rotating discs carried by the tubular element and in having these units carried by an annular piece secured to the fixed support through second removable fixation means, arranged in such manner that it is possible, by removing said second fixation means and without having to act upon the means coupling the fixed support with the framework of the landing gear, to remove as a whole said annular piece and the cylinder-and-piston units that it carries.

Preferred embodiments of the present invention will be hereinafter described with reference to the appended drawings, given merely by way of example, and in which:

FIG. 1 is an axial sectional view of an aircraft wheel provided with a braking device made according to a first embodiment of the invention;

FIG. 2 is, on a smaller scale, an exploded view of the structure illustrated by FIG. 1;

FIG. 3 is a half axial section of an aircraft wheel provided with a braking device made according to a second embodiment of the invention, and FIG. 4 is an exploded view corresponding to FIG. 3.

As shown by FIG. 1 the braking device comprises:

On the one hand, four rotating discs 1 driven in rotation by the wheel 2 to be braked, said discs 1 being provided for this purpose with feather keys cooperating with keyways 4 provided in the rim 2a of wheel 2, and On the other hand, five non rotating discs 5 carried by a braking disc holder 6, said discs 5 being provided with feather keys 7 cooperating with longitudinal keyways 8 provided in the cylindrical portion 6a of holder 6.

Wheel 2 is mounted on a stub axle 9, with the interposition of bearings 10.

Wheel 10 is fixed axially, on the one hand, by a sleeve 11 coaxial with stub axle 9 and bearing upon the frame 12 of the landing gear, stub axle 9 being supported by said frame 12, and, on the other hand, by an abutment piece 13 secured to the end of stub axle 9.

A fixed support 14 carried by stub axle 9 is coupled to the frame 12 of the landing gear through linking means capable of transmitting the braking torque to said frame 12.

This fixed support 14 is of circular shape and provided in its central portion with a bearing 15 centered on sleeve 11 carried by stub axle 9.

The coupling means between support 14 and the frame 12 of the landing gear consists of a coupling bar 16 linked at one of its ends to fixed support 14 and at the other end (not shown) to frame 12.

Fixed support 14 and holder 6 are assembled together through first fixation means which will be hereinafter referred to.

According to the present invention, the cylinder-and-piston units 17 intended to actuate discs 1 and 5 are carried by an annular piece secured to fixed support 14 through second fixation means, easily removable and arranged in such manner that it is possible by merely disconnecting said second fixation means and without having to act upon the means (coupling bars 16) serving to couple fixed support 14 to the frame 12 of the landing gear, to remove the whole of said annular piece 14 and of the cylinder-and-piston units that it carries.

According to the first embodiment of the invention, illustrated by FIG. 1, the annular piece which carries cylinder-and-piston units 17 is integral with holder 6 which comprises the following elements:

Cylindrical support 6a, already referred to, and
A fixed flange 6b carried by the end of cylindrical portion 6a remote from fixed support 14, said flange 6b being secured to cylindrical portion 6a through screws 19.

The annular piece above referred to then consists of a flange 6c carried by the end of tubular portion 6a that is nearer to fixed support 14, the second fixation means being, in this case, the same as the first fixation means through which holder 6 is secured to fixed support 14.

Between fixed support 14 and holder 6, disconnectable connecting means are provided for operating cylinder-and-piston units 17 from control means, designated generally by reference numeral 18 carried by support 14, said control means generally comprising hydraulic connections, a portion of the braking regulation system, the hydraulic relay for separating the circuits, emergency valve means and the electrical connections of the braking control system.

In this case, removal of the annular piece that carries the cylinder-and-piston units 17 results from the removal, as a whole, of holder 6 together with the discs 1 and 5 it contains, and it is possible without having to act upon control means 18 the handling of which is, in most cases, very delicate.

According to the embodiment of FIGS. 1 and 2, holder 6 comprises a central portion 6d through which it is centered on sleeve 11 carried by stub axle 9.

The first and second fixation means are both constituted by screws 20. To transmit the braking torque from disc holder 6 to fixed support 14 there is provided a plurality of studs 21 extending into said fixed support 14 and carried by the flange 6c of holder 6.

FIG. 2 shows how the device of FIG. 1 is taken to pieces.

Wheel 2 is first removed by unscrewing thrust piece 13, rotating discs 1 remaining housed in holder 6.

Then screws 20 are removed and holder 6 is pulled away together with the cylinder-and-piston units 17, the connecting means that are interposed between control means 18 carried by fixed support 14 and the cylinder-and-piston units 17 carried by holder 6 being disconnected when this operation is performed.

Therefore it has not been necessary to act upon control means 18 nor upon the fixation of coupling bar 16. It should be noted that during its removal, holder 6 has remained supported and centered by hub portion 6d during the sliding movement of said holder.

It should be pointed out that the above mentioned connecting means comprise electrical connections and hydraulic connections.

In the case of electrical connections fixation means 24 are provided, the male portion of which remains on fixed support 14 whereas the female portion is located in the portion 6c of holder 6 (FIGS. 1 and 2).

In the case of hydraulic connections, use is made of conduits 25 provided respectively in fixed support 14 and in the portion 6c of holder 6, packing joints 26 being then provided in the plane where said portion 6c and said support 14 adjoin each other (FIGS. 1 and 2).

However, such hydraulic connections require a draining of the circuits every time the brake is taken to pieces and it is preferable to make use of hydraulic connecting means provided with self-operating check valves.

FIGS. 3 and 4 illustrate another embodiment of the invention (the same reference numerals designating the same parts as in FIGS. 1 and 2).

In this case, cylinder-and-piston units 17 are carried by an annular piece 39, in housings 40 thereof, said piece 39, which is separate from, and on the outside of, braking disc holder 6, being carried by an annular surface 38 of fixed support 14.

Annular piece 39 is held against a shoulder 41 of said support 14 by a ring 42 fitting in a circular groove 43 provided in annular surface 38, said ring and groove constituting the above mentioned second fixation means.

In this embodiment of the invention, braking disc holder 6 is coupled angularly with fixed support 14 by longitudinal ribs 60 fixed with respect to said holder 6 and cooperating with longitudinal grooves 61 provided in support 14, said ribs 60 and grooves 61 belonging to the first fixation means.

Disc holder 6 is axially fixed to support 14 by a nut 62 coaxial with the wheel axle and cooperating with screw threads 63 provided on support 14.

Preferably, as shown, ribs 60 form extensions of feather keys 7. Support 14 is provided with a housing 64 coaxial with the wheel and in which are provided the grooves 61 adapted to cooperate with ribs 60.

Braking disc holder 6 further carries, on the inner side of cylindrical support 6a, a hub portion 6e adapted to cooperate with a centering bearing 65. Said centering bearing 65 is provided, on the inner side, with a shoulder 66 forming an abutment for hub portion 6e, and, on the outer side, with screw threads 63 adapted to accommodate nut 62. This nut 62 is advantageously provided with notches 67 through which said nut 62 can be tightened by means of a tubular tool.

This brake is taken to pieces in the following manner, as illustrated by FIG. 4.

Wheel 2 is first removed, discs 1 and 5 remaining in holder 6.

Nut 62 is unscrewed and removed.

A holding tube 68 is inserted into holder 6 and about stub axle 9. This holding tube 68 is provided at its end with screw threads adapted to cooperate with the screw threads 63 of support 14 for fixation of said tube 68 to said support. The external diameter of tube 63 is equal to the diameter of bearing 65 and is provided in its middle part with an inner projection 69 adapted to fit on stub axle 9.

Holder 6, with its discs 5 and 1, is removed by sliding on holding tube 68.

Finally annular piece 39, which carries the cylinder-and-piston units 17, is removed.

In order to obtain a better guiding of holder 6 along holding tube 68, it is advantageous to provide between said tube 68 and the cylindrical portion 6a of holder 6, a sliding sleeve 70 which will be driven, when removing holder 6, by the portion 6e of holder 6, the axial length of said sleeve 70 being approximately equal to that of cylindrical part 6a.

The braking device above described has the following chief advantages:

The brake can be taken to pieces and reassembled without having to act upon the control means nor upon the coupling bar.

Taking to pieces and reassembly of the braking device can be performed by nonspecialized workers.

The braking device can be taken to pieces and reassembled a great number of times without deteriorating important mechanical parts.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the appended claims.

What I claim is:

1. For use in a vehicle including a frame and a wheel journalled in said frame, a braking device for said wheel which comprises, in combination,
    a stub axle rigid with said frame,
    an annular fixed support secured to said stub axle coaxially thereto, said fixed support being provided, on the side thereof turned toward the outer end of said stub axle, with an annular bearing surface,
    an annular holder coaxial with said annular support and including a cylindrical portion and a coaxial annular flange rigid with said cylindrical portion at the end thereof farther from said annular support,
    fixation means for detachably securing said holder to said fixed support coaxially thereto,
    a first plurality of discs angularly fixed to said holder cylindrical portion coaxially thereto, said discs being slidable axially in said holder,
    a second plurality of discs angularly fixed to said wheel coaxially thereto, said last mentioned discs being slidable axially in said holder,
    all of said discs being juxtaposed, with every disc of one of said pluralities interposed between two discs of the other of said pluralities, with the exception of the end discs of the juxtaposition,
    a removable annular support fitting on said annular bearing surface,
    means for detachably securing said removable annular support to said fixed support coaxially thereto, and
    a plurality of cylinder-and-piston units, distributed about said stub axle, carried by said removable annular support, each of said cylinder-and-piston units being interposed between said removable annular support and the juxtaposition of said discs,
    said fixed support being provided with a shoulder turned toward the outer end of said stub axle, said annular support bearing against said shoulder, said means for detachably securing said removable annular support to said fixed support comprising a ring applied against said annular support, said annular bearing surface being provided with a circular groove adapted to accommodate said ring.

2. For use in a vehicle including a frame and a wheel journalled in said frame, a braking device for said wheel which comprises, in combination, a stub axle rigid with said frame, an annular fixed support secured to said stub axle coaxially thereto, said fixed support being provided, on the side thereof turned toward the outer end of said stub axle, with an annular bearing surface, an annular holder coaxial with said annular support and including a cylindrical portion and a coaxial annular flange rigid with said cylindrical portion at the end thereof farther from said annular support, said holder cylindrical portion including longitudinal ribs leaving between them longitudinal keyways, fixation means for detachably securing said holder to said fixed support coaxially thereto, a first plurality of discs angularly fixed to said holder cylindrical portion coaxially thereto, said discs being provided with feather keys adapted to cooperate with said keyways, longitudinal ribs rigid with and forming extensions of said holder longitudinal ribs and of the same cross section as them, said fixed support being provided with longitudinal grooves adapted to cooperate with said extensions of said holder longitudinal ribs, a second plurality of discs angularly fixed to said wheel coaxially thereto, said last mentioned discs being slidable axially in said holder, all of said discs being juxtaposed, with every disc of one of said pluralities interposed between two discs of the other of said pluralities, with the exception of the end discs of the juxtaposition, a removable annular support fitting on said annular bearing surface, means for detachably securing said removable annular support to said fixed support coaxially thereto, and a plurality of cylinder-and-piston units, distributed about said stub axis, carried by said removable annular support, each of said cylinder-and-piston units being interposed between said removable annular support and the juxtaposition of said discs.

3. A braking device according to claim 2, wherein said annular holder includes, integral therewith, a coaxial inner flange, said fixed support being provided with an annular bearing surface adapted to cooperate with said flange which fits thereon, said fixed support including, adjacent said last mentioned bearing surface, a shoulder forming an abutment for said flange and, at the end of said last mentioned bearing surface turned toward the end of said stub axle, a screw-threaded extension, said screw-threaded extension forming one of the elements of said fixation means for detachably securing the holder to the fixed support, the other element of said fixation means consisting of a bolt adapted to engage said screw-threaded extension.

References Cited

UNITED STATES PATENTS 2,875,855   3/1959   Albright ---------- 188—72 X
3,010,543   11/1961  Pear ---------------- 188—72

MILTON BUCHLER, *Primary Examiner.*

G. E. A. HALVOSA, *Assistant Examiner.*